Oct. 21, 1941.   H. M. ALEXANDER   2,259,718
BUILDING UNIT
Filed Aug. 12, 1938
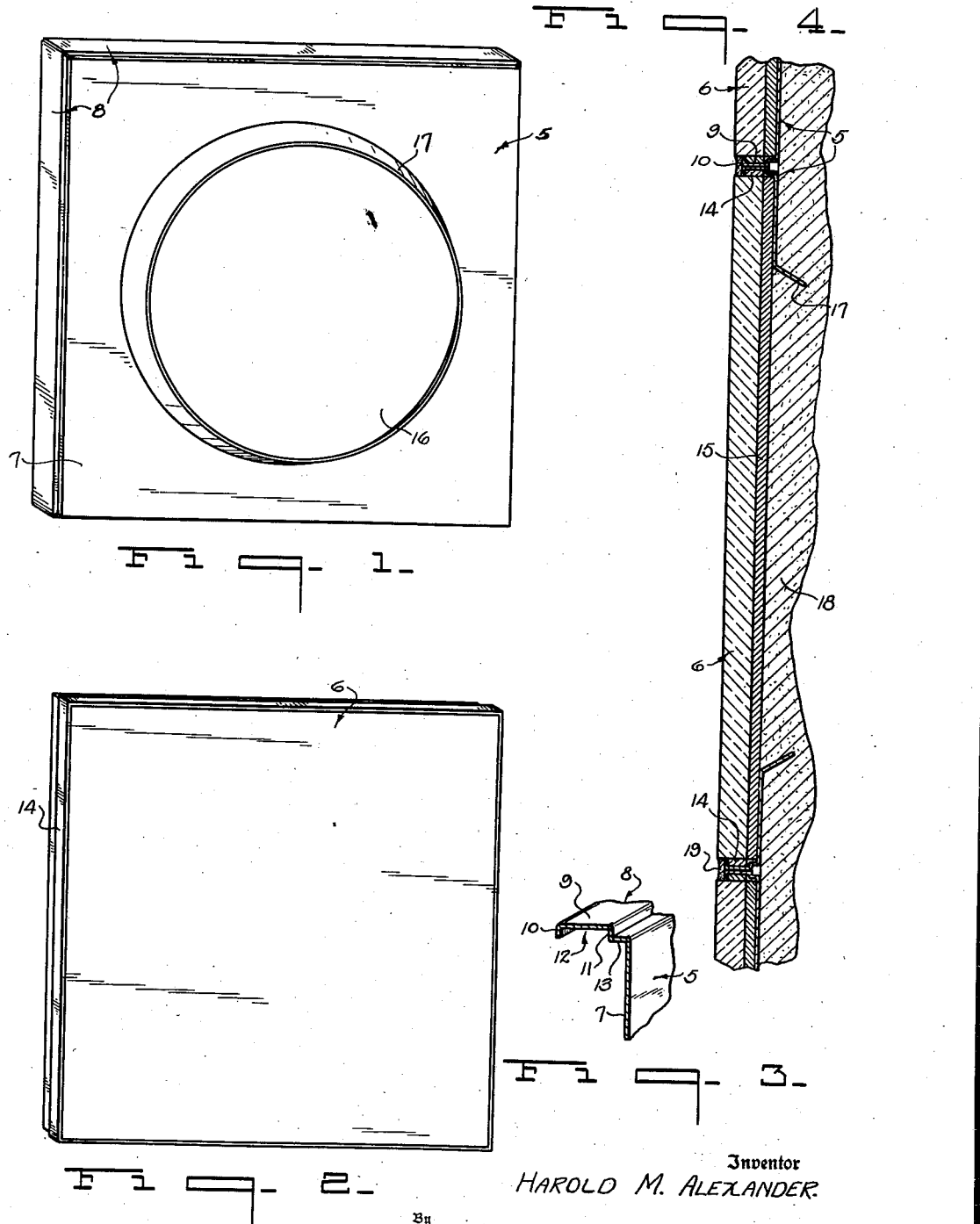
Inventor
HAROLD M. ALEXANDER
By
Frank Fraser
Attorney Patented Oct. 21, 1941

2,259,718

UNITED STATES PATENT OFFICE 2,259,718

BUILDING UNIT

Harold M. Alexander, Toledo, Ohio, assignor to Libbey-Owens-Ford Glass Company, Toledo, Ohio, a corporation of Ohio Application August 12, 1938, Serial No. 224,437

1 Claim. (Cl. 72—18)

The present invention relates broadly to building units and more particularly to that type of unit adapted for the facing of interior and exterior walls.

The building unit of this invention embodies generally a metal holder or supporting element adapted to carry an ornamental facing member of opaque structural glass or the like and being also provided with means whereby the same may be readily secured to the wall to be faced.

An important object of the invention is the provision of a metal supporting element of improved construction for firmly securing the glass facing member in place without requiring any special preparation of the said facing member, such as the grooving or beveling of the edges thereof.

Another important object of the invention is the provision of a metal supporting element having resilient flange means overlying the peripheral edges of the glass facing member and yieldable to facilitate the positioning of the facing member within said supporting element as well as permitting the removal of a broken facing member and the replacement of a new one.

Another important object of the invention is the provision of cushioning means disposed between the edges of the glass facing member and the flange means of the metal supporting element to exert a yielding pressure upon the edges of said facing member whereby to prevent direct metal to glass contact while at the same time permitting relative expansion and contraction between the said facing member and supporting element without danger of breakage of the glass.

Other objects and advantages of the invention will become more apparent during the course of the following description, when taken in connection with the accompanying drawing.

In the drawing, wherein like numerals are employed to designate like parts throughout the same:

Fig. 1 is a perspective view of a metal supporting element constructed in accordance with the invention and looking at the back thereof;

Fig. 2 is a perspective view of the facing member showing a strip of cushioning material arranged around the edges thereof;

Fig. 3 is a perspective sectional view of a portion of the metal supporting element; and Fig. 4 is a section through a supporting wall faced with the building units herein provided.

In the embodiment of the invention illustrated in the drawing, the metal holder or supporting element is designated in its entirety by the numeral 5, while the facing member adapted to be carried thereby is designated 6. The supporting element 5 comprises a rectangular backing or supporting plate 7 formed at the edges thereof with the forwardly directed flanges 8 which are adapted to overlie the edges of the facing member 6. The flanges 8 are preferably channel-shaped and each comprises, as best shown in Fig. 3, a flat base portion 9 extending at substantially right angles to the backing 7 and provided at its opposite longitudinal edges with the inturned lips 10 and 11 which form a relatively shallow channel 12 therebetween. The lip 11 is integrally connected with the backing 7 by a web portion 13.

The facing member 6 preferably consists of a sheet or plate of opaque structural glass such as "Vitrolite" or the like. The peripheral edges of the facing member are preferably square, as shown, and before the said facing member is inserted within the metal supporting element 5, a strip of suitable cushioning material 14 is placed around the edges thereof. The cushioning material may consist of cork tape or the like. When the facing member is inserted within the supporting element, the cushioning material 14 is adapted to be received within the channels 12 formed in the flanges 8 of said supporting element. These flanges are resilient so that they cause the cushioning material to exert a yielding pressure upon the edges of the facing member.

There is also preferably arranged within the supporting element 5, between the backing 7 thereof and the facing member 6, a sheet of suitable moisture resistant material 15 which serves as a protection for the said facing member as well as cushioning the same against shock and blows. The metal supporting element may be provided with any suitable means for securing the same to the supporting wall but is here shown as being provided in its rear face with a large circular opening 16 formed at its edge with a portion 17 struck or pressed up from the backing 7 to provide a securing or anchoring flange for attachment of the supporting element to the wall to be faced.

The building unit above described may be used, as a facing or veneer for either an interior or exterior wall 18, as illustrated in Fig. 4. This wall is preferably covered with a bed layer of plastic material such as cement, plaster of Paris or the like, so that the units may be set in place and secured to the wall by simply first properly positioning the units and then forcing them rearwardly so that the anchoring flanges 17 thereof are embedded in the plastic coating. The flanges 8 of the supporting elements terminate inwardly of the outer surfaces of the facing members and a suitable pointing or caulking compound 19 may be inserted between the edges of adjacent facing members. The flanges 8 of the supporting elements also do not contact directly with the edges of the facing member but exert their holding pressure through the cushioning material 14. This permits relative expansion and contraction between the glass facing member and its supporting element without danger of breakage of the glass. The cushioning material 14 is also relatively thicker than the width of the inturned lips 10 and 11 of flanges 8 so that while said lips extend over or overlap the edges of the cushioning material they do not contact with the edges of the glass facing member.

The glass facing member can be positioned within the metal supporting element in a number of different ways such as by first heating the supporting element to cause the metal to expand sufficiently to permit insertion of the facing or magnets may be used to hold the flanges of the metal supporting element apart during the positioning of the facing therein. The unit may of course be of any desired shape and size and the supporting element and facing member of any desired materials.

It is to be understood that the form of the invention herewith shown and described is to be taken as the preferred embodiment of the same, and that various changes in the shape, size and arrangement of parts may be resorted to without departing from the spirit of the invention or the scope of the subjoined claim.

I claim:

In a building unit of the character described, a vitreous facing member, cushioning strips engaging the edges of the facing member, a metal supporting element for said facing member comprising a backing plate provided with forwardly directed flange means disposed opposite the edges of said facing member and having spaced inner and outer inturned lips forming therebetween a relatively shallow channel for receiving the cushioning strips therein, the said inner and outer lips overlapping the edges of the said cushioning strips but spaced from the edges of said facing member, a sheet of moisture resistant material covering the entire rear surface of said facing member and disposed between the said facing member and the backing plate of the said supporting element for spacing them from one another, and means carried by said supporting element for securing the same to a supporting wall.

HAROLD M. ALEXANDER.